US008825395B2

(12) United States Patent
Boss et al.

(10) Patent No.: US 8,825,395 B2
(45) Date of Patent: *Sep. 2, 2014

(54) ROUTE OPTIMIZATION (71) Applicant: International Business Machines Corporation, Armonk, NY (US)

(72) Inventors: Gregory J. Boss, Saginaw, MI (US); Michele P. Brignull, Essex Junction, VT (US); Rich A. Hamilton, II, Charlottesville, VA (US); Pamela A. Nesbitt, Durham, NC (US); Anne R. Sand, Canon City, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/036,431

(22) Filed: Sep. 25, 2013

(65) Prior Publication Data

US 2014/0025294 A1 Jan. 23, 2014

Related U.S. Application Data

(63) Continuation of application No. 12/712,917, filed on Feb. 25, 2010, now Pat. No. 8,566,035.

(51) Int. Cl.
*G01C 21/34* (2006.01)

(52) U.S. Cl.
USPC ..... 701/468; 705/14.1; 705/14.11; 705/14.13

(58) Field of Classification Search
USPC .................. 701/1, 19, 23–28, 117–119, 400, 701/408–416, 420–423, 425, 468, 517, 532, 701/533; 705/1.1, 5, 6, 13, 14.1, 14.2, 705/14.11, 14.13, 14.16, 14.19, 14.23, 705/14.24, 14.27–14.36, 14.39, 14.43; 340/988, 989, 990, 995.1, 995.19; 709/224, 238, 242
See application file for complete search history.

(56) References Cited

U.S. PATENT DOCUMENTS

| 5,220,507 A | 6/1993 | Kirson |
| 5,515,283 A | 5/1996 | Desai et al. |
| 5,543,789 A | 8/1996 | Behr et al. |

(Continued)

OTHER PUBLICATIONS de Feijter, R., et al., "Improving Travel-Time Reliability by the Use of Trip Booking", IEEE Transactions on Intelligent Transportation Systems, vol. 5, No. 4, Dec. 2004, 5 pages.

(Continued)

*Primary Examiner* — Marthe Marc-Coleman
(74) *Attorney, Agent, or Firm* — William E. Ssciesser; Keohane & D'Alessandro, PLLC (57) ABSTRACT

In one embodiment, there is provided visibility to future predicted traffic situations, based on all reserved routes in a system at a given point in time. This allows city planners, for example, to know where traffic will be to adjust traffic flow accordingly. Additional value comes into play by being able to calculate and publish aggregated savings from using this system, such as driver time, mileage, and gas. This information may be added to a database and made available to individuals via their GPS. In a typical implementation, a request for a route is received from a requester. Based on the request, an optimized route and a potential position of the requester within the optimized route are determined and then proposed to the requester. The requester can then select an option from the proposal.

20 Claims, 5 Drawing Sheets

(56) References Cited

U.S. PATENT DOCUMENTS

| | | | |
|---|---|---|---|
| 5,604,676 | A | 2/1997 | Penzias |
| 5,610,821 | A | 3/1997 | Gazis et al. |
| 5,774,827 | A * | 6/1998 | Smith et al. ............... 701/431 |
| 5,978,770 | A | 11/1999 | Waytena et al. |
| 6,256,577 | B1 | 7/2001 | Graunke |
| 6,609,061 | B2 | 8/2003 | MacPhail et al. |
| 6,681,175 | B2 | 1/2004 | MacPhail et al. |
| 6,708,111 | B2 | 3/2004 | Park |
| 6,738,750 | B2 | 5/2004 | Stone et al. |
| 6,748,364 | B1 | 6/2004 | Waytena et al. |
| 6,853,915 | B2 | 2/2005 | Hubschneider et al. |
| 6,873,969 | B2 | 3/2005 | Stone et al. |
| 6,885,935 | B2 | 4/2005 | MacPhail et al. |
| 7,375,649 | B2 | 5/2008 | Gueziec |
| 7,483,786 | B1 | 1/2009 | Sidoti et al. |
| 7,508,321 | B2 | 3/2009 | Gueziec et al. |
| 7,516,148 | B2 | 4/2009 | Waytena et al. |
| 7,895,066 | B2 | 2/2011 | Waytena et al. |
| 7,941,267 | B2 | 5/2011 | Adamczyk et al. |
| 7,966,215 | B1 | 6/2011 | Myers et al. |
| 2001/0047242 | A1 * | 11/2001 | Ohta ............... 701/210 |
| 2003/0040944 | A1 | 2/2003 | Hileman |
| 2007/0083322 | A1 | 4/2007 | Van Ee |
| 2007/0276596 | A1 | 11/2007 | Solomon et al. |
| 2008/0021723 | A1 | 1/2008 | Devarakonda |
| 2008/0033769 | A1 | 2/2008 | Koorapati et al. |
| 2008/0133284 | A1 | 6/2008 | Birch et al. |
| 2009/0043486 | A1 | 2/2009 | Yang et al. |
| 2011/0130954 | A1 | 6/2011 | D'Andrea et al. |

OTHER PUBLICATIONS

Ravi, N., et al., "Lane Reservation for Highways (Position Paper)", Proceedings of the 2007 IEEE Intelligent Transportation Systems Conference, Seattle, WA, Sep. 30-Oct. 3, 2007, 6 pages.

Edara P., et al., "Model of an advance-booking system for highway trips", ScienceDirect Transportation Research Part C 16 (2008), pp. 36-53, www.sciencedirect.com.

Wong, Jinn-Tsai, "Basic Concepts for a System for Advance Booking for Highway Use", Transport Policy, vol. 4, No. 2, pp. 109-114 (1997).

Koolstra K., "Potential benefits of a freeway slot-reservation system: Queing costs versus scheduling costs", Paper prepared for the Urban Transport Systems Conference, Lund, Sweden, Jun. 7-8, 1999, 12 pages.

Lindsay Browder, USPTO Office Action, U.S. Appl. No. 12/712,917, Date Mailed Mar. 27, 2012, 27 pages.

Lindsay Browder, USPTO Final Office Action, U.S. Appl. No. 12/712,917, Date Mailed Jun. 26, 2012, 19 pages.

Marthe Y. Marc-Coleman, USPTO Office Action, U.S. Appl. No. 12/712,917, Date Mailed Feb. 25, 2013, 36 pages.

Marthe Y. Marc-Coleman, USPTO Notice of Allowance and Fee(s) Due, U.S. Appl. No. 12/712,917, Date Mailed Jun. 17, 2013, 6 pages.

* cited by examiner

ROUTE OPTIMIZATION

RELATED U.S. APPLICATION DATA

The present patent application is a continuation of U.S. patent application Ser. No. 12/712,917, now U.S. Pat. No. 8,566,035, filed Feb. 25, 2010, entitled "ROUTE OPTIMIZATION", the disclosure of which is incorporated herein by reference.

TECHNICAL FIELD

The present invention generally relates to route optimization. In one embodiment, the present invention relates to traffic route optimization.

BACKGROUND

The use of GPS navigation systems in automobiles is becoming commonplace. Users are increasingly dependent on GPS devices to plan and direct their routes, real-time. Currently, traffic is stochastic, as people drive to and from locations in a completely unpredictable manner.

Currently, when a large number of drivers are traveling to the same destination, or in the same area, traffic jams occur with little coordinated planning to prevent them. Also, given the chaotic and currently unpredictable nature of society and driving, the quantity of cars driving from random destinations, taking random routes, and arriving at random locations makes optimizing the system very difficult. For example, when a popular event is planned (e.g., sporting event or concert), local authorities may dispatch officers to help direct traffic, or they may post signs warning of the traffic congestion. While these responses are proactive in nature, they often do not have a significant impact on traffic congestion, nor do they enable incentives for improved driving.

SUMMARY

In general, the present invention relates to route optimization/prediction. In one embodiment, the present invention provides visibility to future predicted traffic situations, based on all reserved routes in a system at a given point in time. This allows city planners, for example, to know where traffic will be to adjust traffic flow accordingly. Additional value comes into play by being able to calculate and publish aggregated savings from using this system, such as driver time, mileage, and gas. This information may be added to a database and made available to individuals via their GPS. In a typical implementation, a request for a route is received from a requester. Based on the request, an optimized route and a potential position of the requester within the optimized route are determined and then proposed to the requester. The requester can then select an option from the proposal.

A first aspect of the present invention provides a method for optimizing routes, comprising: receiving a request for a route from a requester; determining an optimized route and a potential position of the requester within the optimized route based on the request; providing a proposal in response to the request, the proposal comprising the optimized route and the potential position; and receiving a response to the proposal.

A second aspect of the present invention provides a system for optimizing traffic routes, comprising: a memory medium comprising instructions; a bus coupled to the memory medium; and a processor coupled to the bus that when executing the instructions causes the system to: receive a request for a traffic route from a requester; determine an optimized traffic route and a potential position of the requester within the optimized traffic route based on the request; provide a proposal in response to the request, the proposal comprising the optimized traffic route and the potential position; and receive a response to the proposal.

A third aspect of the present invention provides a computer readable medium containing a program product for optimizing traffic routes, the computer readable medium comprising program code for causing a computer to: receive a request for a traffic route from a requester; determine an optimized traffic route and a potential position of the requester within the optimized traffic route based on the request; provide a proposal in response to the request, the proposal comprising the optimized traffic route and the potential position; and receive a response to the proposal.

A fourth aspect of the present invention provides a method for deploying a system for optimizing traffic routes, comprising: providing a computer infrastructure being operable to: receive a request for a traffic route from a requester; determine an optimized traffic route and a potential position of the requester within the optimized traffic route based on the request; provide a proposal in response to the request, the proposal comprising the optimized traffic route and the potential position; and receive a response to the proposal.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description of the Invention has the following sections:

I. General Description
II. Computerized Implementation

I. General Description

As indicated above, the present invention relates to route optimization/prediction. In one embodiment, the present invention provides visibility to future predicted traffic situations, based on all reserved routes in a system at a given point in time. This allows city planners, for example, to know where traffic will be to adjust traffic flow accordingly. Additional value comes into play by being able to calculate and publish aggregated savings from using this system, such as driver time, mileage, and gas. This information may be added to a database and made available to individuals via their GPS. In a typical implementation, a request for a route is received from a requester. Based on the request, an optimized route and a potential position of the requester within the optimized route are determined and then proposed to the requester. The requester can then select an option from the proposal.

One added and useful benefit that this system provides is visibility to future predicted traffic situations, based on all reserved routes in the system at a given point in time. This allows city planners, for example, to know where traffic will be and adjust traffic flow accordingly. Additional value comes into play by being able to calculate and publish aggregated savings from using this system, such as driver time, mileage, and gas. This information may be added to a database and made available to individuals via their GPS.

In a typical embodiment, this invention allows drivers to designate their intended driving route to/from an event or location in advance, and "reserve" a driving route. By doing this, GPS or other navigational systems can then be used to calculate user travel routes in ways that will:

1. improve traffic congestion;
2. enable drivers to select routes that coincide with latest designated "preferred" routes to/from a given event or location;
3. enable event coordinators, sellers or local public works departments to reward achieving of desired traffic patterns; and
4. create markets for trading assigned traffic routings.

It is assumed that a finite number of reservations are available at any given time for a specific route due to size of roads, road conditions, traffic expectations etc., making the route reservation a desirable asset.

A summary of the steps for this system are as follows:
1. Request Route.
2. Optimize Route.
3. Reserve Route.
4. Queue Route.
5. Deliver Route and Offers.
6. Trade Route (optionally).
7. Collect feedback & learn for future routing.

This invention provides a benefit for the society as a whole by optimizing the overall patterns of traffic to minimize congestion. Although each participant may not get the most direct route for his/herself, traffic jams will be avoided and the greater good will be served. The currently random system of traffic is optimized.

Figure 1:
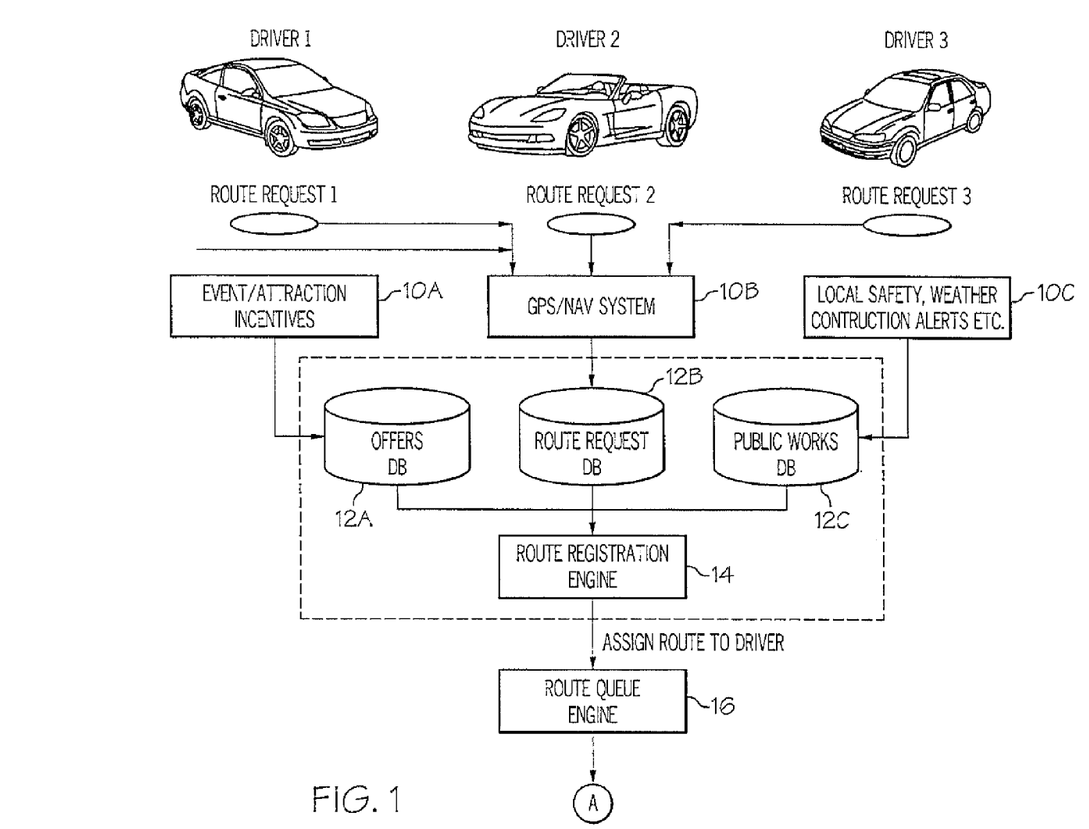
FIG. 1 shows a first method flow diagram according to an embodiment of the present invention.

Referring now to FIG. 1, a first process flow diagram according to an embodiment of the present invention is shown. As depicted, drivers 1-3 can request routes (e.g., automated) using various techniques such an event attraction/incentive system 10A, a GPS/navigation system 10B and/or a local alert system 10C (e.g., safety, weather, etc.). With this invention, if a driver requests and registers his/her route early, (s)he is more likely to be given his preferred path than someone that requests the route last-minute. Users are incented to participate since this helps in planning for high volume traffic, especially in situations that do not follow predictable patterns. Cities may then change the timing of lights, etc. to accommodate this predicted traffic.

The requests can be routed via request databases 12A-C to route registration engine 14, which manages all routes between various registrations. Based on the request, the route registration engine will determine a set (at least one) of optimized routes for each driver 1-3, and route queue engine 16 will determine a potential position of each driver within each corresponding route. For example, assume that two optimized routes (e.g., A and B) have been determined for driver 1. It could be the case that driver 1 would be assigned a potential position of $20^{th}$ within route A, and position of $15^{th}$ within route B. In a typical embodiment, optimal routings for each driver can be determined based upon the following inputs:

Driver route requests and preferences. For example: allow me to leave at the last possible minute or ensure I am not late, etc.

Automated route requests.

Promotions (e.g., free parking to first 100 registrants; t-shirt; ticket discounts; toll reductions). Market incentives are introduced to allow the consumers to opt in. Network externality (i.e., network effect) applies to this invention because the more people that participate, the better it works for all.

Public works data (e.g., water main break on Main Street, or bad weather slowdowns).

Routing optimization may be based on, but not limited to:

The number of days in advance that a request is made;

Type of car being driven (e.g., reward fuel efficient models);

Designated "preferred paths" (e.g., avoiding school zones during certain hours, HOV lanes, or partial/full routes reserved only for participants)

A route may be dynamically changed based on the real-time situation. For example:

"Route correction" requests can be automatically generated in the event you are running late for your assigned route. The GPS system knows what time you start your car and the assigned start time of your reserved route. If these are different, a new route may be automatically generated & reserved.

The original route you registered for weeks ago has been "upgraded" based on new real-time factors (e.g., cancellations which bump you up in the queue). In the case of upgrades, incentives may also accompany the new upgraded route.

Business intelligence (BI) & analytics:

Use of BI and known analytical tools to determine what routes are working and which are not, and provide feedback to the system to enable future updates of routing algorithms. This feedback may be based on an individual's route success ratios (e.g., number of routes completed within specified window of assigned timings for the route vs. the number of times the exact route was used), OR on the user population as a whole (i.e., analyze ALL of the success ratios of a given pool of route reserving users).

Identification of instances where drivers (e.g., a pool of drivers) take more or less time to traverse a piece of road than is predicted based upon known variables. These instances are noted and the system automatically accounts for different timings in the future. This takes into account factors which may not be known to the GPS or computer system, such as severe pot holes, dirt road washouts etc.

The system logs and recognizes instances where you leave later than assigned but arrive earlier than expected at your destination and adjusts future routes accordingly (e.g., for forecasting purposes).

In addition, the position of a driver within a route represents the driver's order in the broader routing plan. Along these lines, the following features are provided under the invention:

If a driver cancels or does not take the preregistered route, the queue can be dynamically updated to offer new routes to those next in line.

The route queue engine 16 has the ability to compare exact locations vs. preregistered routes to check for compliance. This may be accomplished by applying customizable rules to define local compliance guidelines (e.g., rewarding frequent driver points under certain conditions).

Figure 2:
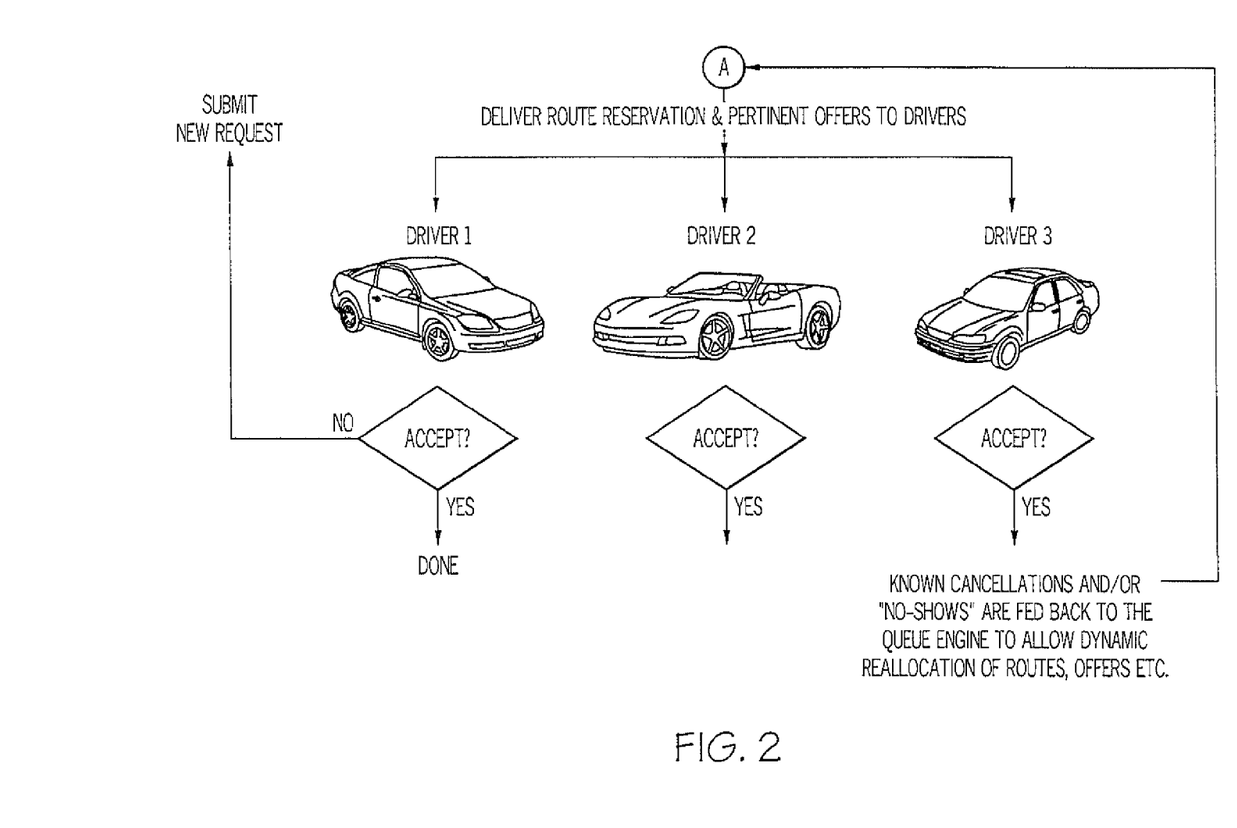
FIG. 2 shows a second method flow diagram according to an embodiment of the present invention.

Regardless, referring to FIG. 2, once optimized routes and potential positions are determined, they will be sent back to the corresponding drivers 1-3 as proposals via route queue engine 16. Each driver 1-3 can then make a determination as to which route to select. If none are desirable, the process will repeat and a new proposal will be determined (if possible). If a selection of a particular route/position is made, that route and position will be reserved (e.g., by route queue engine 16).

In delivering the routes and offers/proposals, the following functions are provided hereunder:

The requesters' optimized route is sent back to the requester, along with any applicable offers/promotions.

The requester may accept or reject the assigned route. If rejected, the requester may place a new route request.

The requester may also cancel a previously registered route.

For requesters that do NOT take their assigned routes, offers/incentives may be revoked or diminished.

Likewise, rewards and/or incentives may be adjusted dynamically based on real-time changes to the routes.

Figure 3:
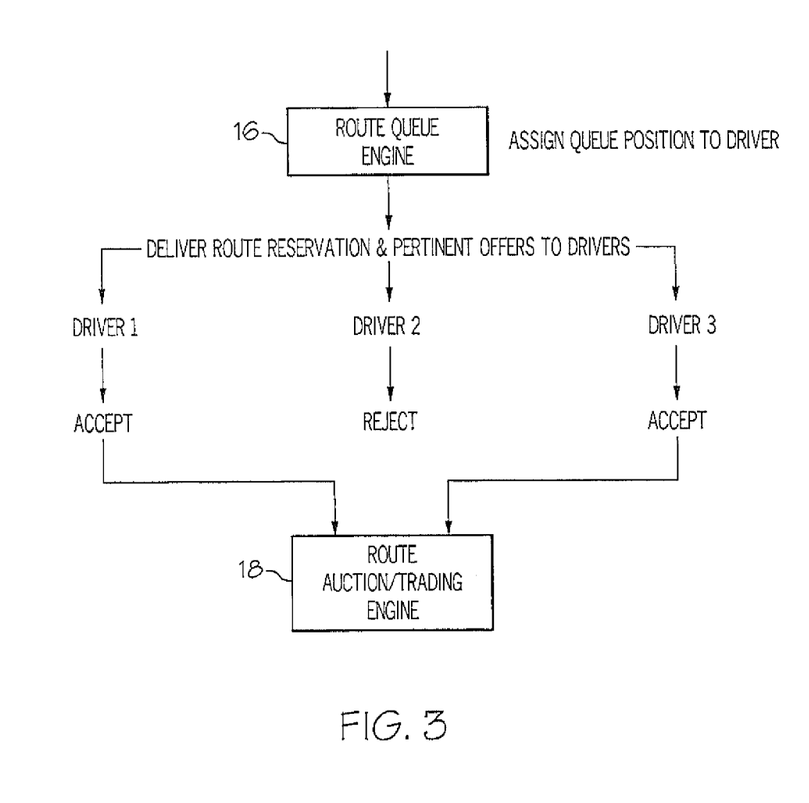
FIG. 3 shows a third method flow diagram according to an embodiment of the present invention.

An additional feature of the invention is the ability of drivers to trade routes and/or positions. For example, referring to FIG. 3, route trade engine 18 can coordinate the offering, accepting, and reassignment of routes and/or positions within routes between drivers. Assume that driver 1 has been assigned route A and position X. Further assume that driver 2 has been assigned route B and position Y. The two have the capability to trade either routes or positions. This tracking and management of this exchange is coordinated by the route trading engine. It should be understood that the trades can be conducted in accordance with any trading approach now known or later developed. For example, routes/positions could be traded in an auction format, they could be exchanged concurrently for another route/position or some other compensation (e.g., financial), or they could be traded for a compensation to be determined later.

Example Scenario:

1. High traffic-volume event is planned for a location (e.g., important sporting event or concert).
2. When a user purchases a ticket to the event, it is automatically registered to the routing system.
3. His home address is used as a default starting point or if he requests anonymity, his general neighborhood is given as a starting point.
4. User's route is recorded, including expected time of departure, rate of travel over route, and expected time of arrival.
5. Routing system may predict how many people will be on the road at that time and what routes they will take, so it can preemptively reroute certain people to prevent a traffic jam.
6. People who purchased their ticket early and had their route registered early are assigned the most direct route. They are incented for their participation in helping with traffic management for all.
7. Others who purchased their tickets late are assigned a slightly longer route, but one that will prevent jams for all. They are incented for following their prescribed route.

II. Computerized Implementation

Figure 4:
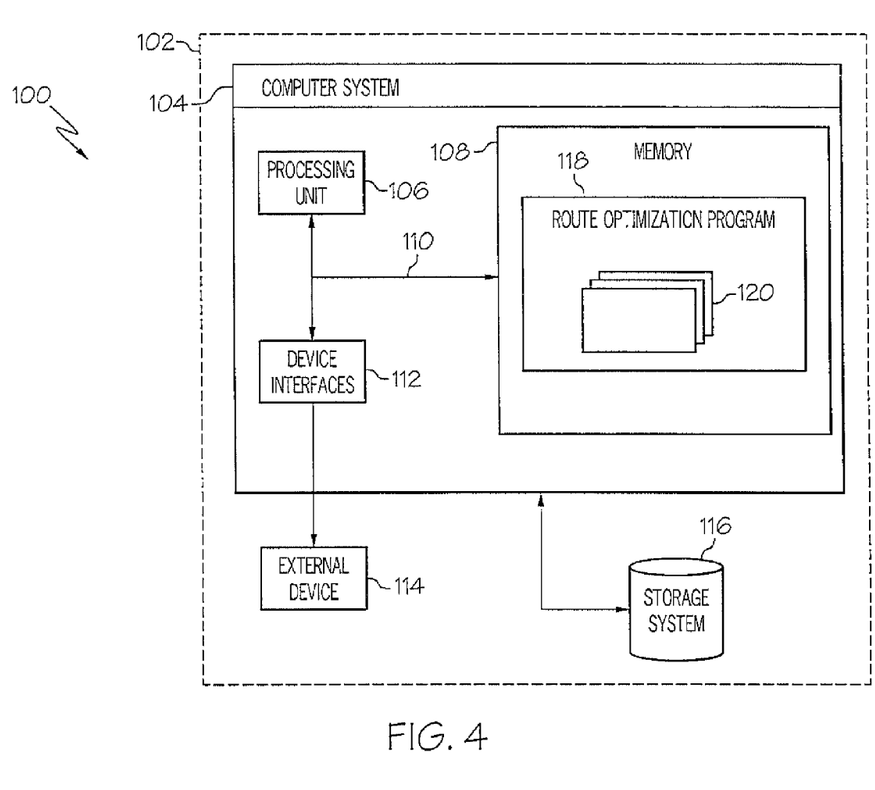
FIG. 4 shows a more specific computerized implementation according to an embodiment of the present invention.

Referring now to FIG. 4, a computerized implementation 100 of the present invention is shown. As depicted, implementation 100 includes a computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

As shown, computer system 104 includes a processing unit 106, a memory 108, a bus 110, and a device interfaces 112. Further, computer system 104 is shown having external devices 114 and storage system 116 that communicate with bus 110 via device interfaces 112. In general, processing unit 106 executes computer program code, such as route optimization software/program 118, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as a keyboard, a pointing device, a display, etc.; one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose-computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations (e.g., on a client and server). Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 4 can be included in computer system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Figure 5:
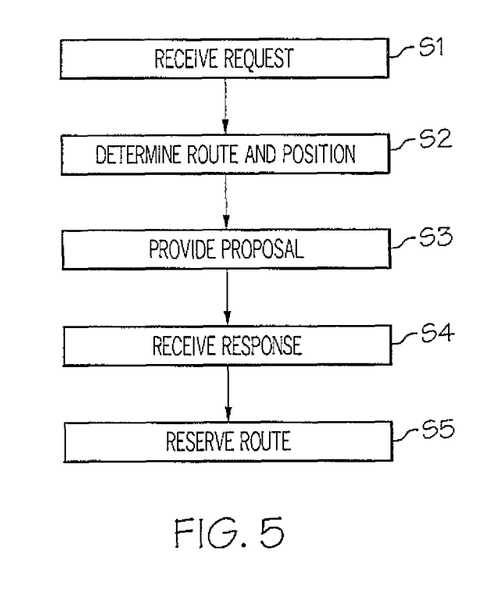
FIG. 5 shows a method flow diagram according to an embodiment of the present invention.

Shown in memory 108 of computer system 104 is route optimization program 118, with a set of modules 120. The modules 120 generally provide the functions of the present invention as described herein. Specifically (among other things), set of modules 120 is configured to (as shown in conjunction with the method flow diagram of FIG. 5: receive a request for a route from a requester in step S1; determine an optimized route and a potential position of the requester within the optimized route based on the request in step S2; provide a proposal in response to the request, the proposal comprising the optimized route and the potential position in step S3; receive a response to the proposal S4; and reserve the optimized route pending the response in step S5.

While shown and described herein as a route optimization solution, it is understood that the invention further provides various alternative embodiments. For example, in one embodiment, the invention provides a computer-readable/useable medium that includes computer program code to enable a computer infrastructure to provide a route optimization solution. To this extent, the computer-readable/useable medium includes program code that implements each of the various process of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), and/or on one or more data storage portions of a computing device, such as memory 108 (FIG. 4) and/or storage system 116 (FIG. 4) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide a route optimization solution. In this case, the service provider can create, maintain, support, etc., a computer infrastructure, such as computer infrastructure 102 (FIG. 4) that performs the process of the invention for one or more customers. In return, the service provider can receive payment from the customer(s) under a subscription and/or fee agreement and/or the service provider can receive payment from the sale of advertising cont6

In still another embodiment, the invention provides a computer-implemented method for route optimization. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: installing program code on a computing device, such as computer system 104 (FIG. 4), from a computer-readable medium; adding one or more computing devices to the computer infrastructure; and incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for optimizing routes, comprising:
receiving, using at least one computing device, a request for a route from a requester, the requester having a vehicle associated therewith;
determining, using the at least one computing device, an optimized route and a potential position of the requester within the optimized route based on the request;
providing, using the at least one computing device, a proposal in response to the request, the proposal comprising the optimized route and the potential position;
receiving, using the at least one computing device, a response to the proposal;
assigning, using the at least one computing device, the requester to the optimized route, the potential position, and a start time when the response comprises an acceptance of the proposal; and
automatically generating, using the at least one computing device, an alternate route in response to a detection, via Global Positioning Satellite technology, that the requester started the vehicle at a different time from the assigned start time, the alternate route accounting for the different time.

2. The method of claim 1, further comprising reserving, using the at least one computing device, the optimized route pending the response.

3. The method of claim 1, the proposal further comprising a set of alternative optimized routes and corresponding potential positions.

4. The method of claim 1, further comprising trading, using the at least one computing device, the optimized route and the potential position of the requester with another optimized route and another potential position of another requester.

5. The method of claim 1, further comprising collecting, using the at least one computing device, feedback based on an execution of the proposal.

6. The method of claim 1, the route being a traffic route, and the determining being based on Global Positioning Satellite (GPS) technology.

7. The method of claim 1, further comprising providing, using the at least one computing device, an incentive to the requester based on an advance time of at least one of: the request for the route, and the response to the proposal.

8. The method of claim 1, wherein the method is performed by a solution service provider for one or more consumers.

9. A system for optimizing traffic routes, comprising:
a memory medium comprising instructions;
a bus coupled to the memory medium; and
a processor coupled to the bus that when executing the instructions causes the system to:
receive a request for a traffic route from a requester, the requester having a vehicle associated therewith;
determine an optimized traffic route and a potential position of the requester within the optimized traffic route based on the request;
provide a proposal in response to the request, the proposal comprising the optimized traffic route and the potential position;
receive a response to the proposal;
assign, using the at least one computing device, the requester to the optimized route, the potential position, and a start time when the response comprises an acceptance of the proposal; and
automatically generate, using the at least one computing device, an alternate route in response to a detection, via Global Positioning Satellite technology, that the requester started the vehicle at a different time from the assigned start time, the alternate route accounting for the different time.

10. The system of claim 9, the system further being caused to reserve the optimized traffic route pending the response.

11. The system of claim 9, the proposal further comprising a set of alternative optimized traffic routes and corresponding potential positions.

12. The system of claim 9, the system further being caused to trade the optimized traffic route and the potential position of the requester with another optimized traffic route and another potential position of another requester.

13. The system of claim 9, the system further being caused to collect feedback based on an execution of the proposal.

14. The system of claim 9, the optimized traffic route being determined based on Global Positioning Satellite (GPS) technology.

15. A computer readable storage device containing a program product for optimizing traffic routes, the computer readable storage device comprising program code for causing a computer to:
receive a request for a traffic route from a requester, the requester having a vehicle associated therewith;
determine an optimized traffic route and a potential position of the requester within the optimized traffic route based on the request;
provide a proposal in response to the request, the proposal comprising the optimized traffic route and the potential position;
receive a response to the proposal;
assign, using the at least one computing device, the requester to the optimized route, the potential position, and a start time when the response comprises an acceptance of the proposal; and
automatically generate, using the at least one computing device, an alternate route in response to a detection, via Global Positioning Satellite technology, that the requester started the vehicle at a different time from the assigned start time, the alternate route accounting for the different time.

16. The computer readable medium containing the program product of claim 15, the computer readable storage device further comprising program code for further causing the computer to reserve the optimized traffic route pending the response.

17. The computer readable storage device containing the program product of claim 15, the proposal further comprising a set of alternative optimized traffic routes and corresponding potential positions.

18. The computer readable storage device containing the program product of claim 15, the computer readable medium further comprising program code for further causing the computer to trade the optimized traffic route and the potential position of the requester with another optimized traffic route and another potential position of another requester.

19. The computer readable storage device containing the program product of claim 15, the computer readable medium further comprising program code for further causing the computer to collect feedback based on an execution of the proposal.

20. The computer readable storage device containing the program product of claim 15, the optimized traffic route being determined based on Global Positioning Satellite (GPS) technology.

* * * * *